United States Patent [19]

Marraccini et al.

[11] Patent Number: 5,237,108
[45] Date of Patent: Aug. 17, 1993

[54] PERFLUOROPOLYETHERS AND PROCESSES FOR THEIR PREPARATION

[75] Inventors: Antonio Marraccini; Antonio Pasquale, both of Novara; Anna M. Staccione; Giuseppe Marchinonni, both of Milan, all of Italy

[73] Assignee: Ausimont S.r.l., Milan, Italy

[21] Appl. No.: 890,083

[22] Filed: May 29, 1992

Related U.S. Application Data

[62] Division of Ser. No. 664,858, Mar. 5, 1991, Pat. No. 5,144,092.

Foreign Application Priority Data

Jun. 3, 1990 [IT] Italy .............................. 19585 A/90

[51] Int. Cl.$^5$ ............................................. C07C 43/12
[52] U.S. Cl. ..................................... 568/615; 568/614
[58] Field of Search ....................... 568/615, 613, 614

[56] References Cited

U.S. PATENT DOCUMENTS

| | | | |
|---|---|---|---|
| 3,214,478 | 10/1965 | Milian | 568/615 |
| 3,650,928 | 4/1972 | Sianesi et al. | 568/615 |
| 3,699,145 | 10/1972 | Sianesi et al. | 568/615 |
| 3,715,387 | 2/1973 | Pierce et al. | 568/615 |
| 3,770,792 | 11/1973 | Sianesi et al. | 568/615 |
| 3,810,874 | 5/1974 | Mitsch et al. | 568/615 |
| 4,668,357 | 5/1977 | Marchionnie et al. | 568/615 |
| 4,889,939 | 12/1989 | Caporiccio et al. | 568/615 |
| 4,900,872 | 2/1990 | Guglielmo et al. | 568/615 |
| 4,960,951 | 10/1990 | Nappa et al. | 568/615 |
| 5,013,472 | 6/1991 | Marraccini | 568/615 |
| 5,025,093 | 5/1991 | Lagow et al. | 568/615 |

FOREIGN PATENT DOCUMENTS

| | | | |
|---|---|---|---|
| 0195946 | 1/1986 | European Pat. Off. | 568/615 |
| 0196630 | 10/1986 | European Pat. Off. | 568/615 |
| 0259980 | 3/1988 | European Pat. Off. | . |
| 0290848 | 11/1988 | European Pat. Off. | 568/615 |
| 0340739 | 11/1989 | European Pat. Off. | 568/615 |
| 0393230 | 10/1990 | European Pat. Off. | . |
| 0440199 | 8/1991 | European Pat. Off. | 568/615 |
| 0344547 | 12/1991 | European Pat. Off. | 568/615 |
| 1231758 | 10/1990 | Italy | . |

*Primary Examiner*—Werren B. Lone
*Attorney, Agent, or Firm*—Stevens, Davis, Miller & Mosher

[57] ABSTRACT

The invention relates to new peroxide perfluoropolyethers having formula:

$$AO(CF_2O)_a(CF_2-CFO)_b(CFO)_c(O)_dB \qquad (I)$$
$$\phantom{AO(CF_2O)_a(CF_2-}|\phantom{FO)_b(}|$$
$$\phantom{AO(CF_2O)_a(CF_2-}O\phantom{FO)_b}O$$
$$\phantom{AO(CF_2O)_a(CF_2-}|\phantom{FO)_b(}|$$
$$\phantom{AO(CF_2O)_a(CF_2-}X\phantom{FO)_b}X$$

wherein:
A and B are end groups,
X represents a $(R'O)_mR''$ group where $R'$ is selected from the class consisting of $$-CF_2-, \; -CF_2-CF_2- \; \text{and} \; -CF_2-CF-,$$
$$\phantom{-CF_2-, \; -CF_2-CF_2- \; \text{and} \; -CF_2-}|$$
$$\phantom{-CF_2-, \; -CF_2-CF_2- \; \text{and} \; -CF_2-}CF_3$$

and $R''$ is a perfluoroalkyl group; the value of "m" ranging from 0 to 6.

The invention relates also to processes for preparing said perfluoropolyethers and other classes of non peroxide perfluoropolyethers derived therefrom.

5 Claims, No Drawings

PERFLUOROPOLYETHERS AND PROCESSES FOR THEIR PREPARATION

This is a division of application Ser. No. 07/664,858 filed Mar. 5, 1991, now U.S. Pat. No. 5,144,092.

The present invention relates to new perfluoropolyethers and to processes for preparing them.

Various types of perfluoropolyethers are known, which are obtained for example by oxidation of perfluoroolefins, such as $C_2F_4$ and $C_3F_6$, with oxygen, under the action of ultraviolet radiation. European patent application 259,980 describes perfluoropolyethers prepared in like manner starting from perfluoroolefins and perfluoroalkylvinylethers.

It is an object of the present invention to provide a new class of peroxide perfluoropolyethers.

Another object is that of providing a new class of non-peroxide perfluoropolyethers prepared by reduction of the above-mentioned peroxide perfluoropolyethers.

A further object is that of providing a new class of perfluoropolyethers having perfluoroalkyl end groups and optionally perfluoroalkyl end groups containing one or more ether oxygen atoms.

Another object is that of providing a new class of perfluoropolyethers having one or two hydrofluoroalkyl end groups.

A further object is that of providing a new class of perfluoropolyethers having one or two functional end groups.

Still another object is that of providing new classes of perfluoropolyethers free from units $$(CF-CF_2O) \text{ and } (CF_2-CF_2O)$$
$$\phantom{xxx}|$$
$$\phantom{xxx}CF_3$$

having—their molecular weight being equal to the one of the perfluoropolyethers containing such units—a much lower viscosity.

Lastly, another object is that of providing processes for preparing the abovesaid peroxide perfluoropolyethers.

The first of these objects are achieved by the peroxide perfluoropolyethers according to the present invention, having the formula:

$$AO(CF_2O)_a(CF_2-CFO)_b(CFO)_c(O)_dB \quad (I)$$

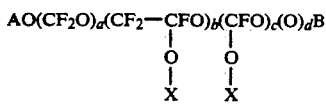

wherein
units $(CF_2O)$,

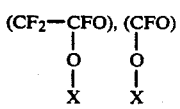

and (O) are randomly distributed along the chain; X represents a $(R'O)_mR''$ group or two or more different $(R'O)_mR''$ groups wherein R' is selected from the class consisting of

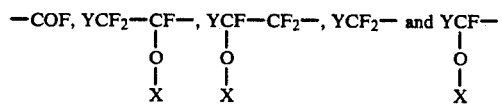

R" is a perfluoroalkyl group selected from straight chain groups having 1 to 10 carbon atoms, branched chain groups having 3 to 10 carbon atoms and cyclic groups having 3 to 6 carbon atoms, and "m" ranges from 0 to 6;

a, b, c and d are zero or integers, the sum $b+c$ is equal to or higher than 2; the sum $a+b+c$ is equal to or higher than 2 and the sum $a+b+c+d$ is equal to or higher than 2; when a and/or c are other than zero and also is other than zero, the ratio $$\frac{b}{a+c}$$

ranges from $10^{-2}$ to $10^3$; when a and c are simultaneously other than zero, the ratio $$\frac{c}{a}$$

ranges from $10^{-2}$ to $10^2$; when d is other than zero, the $d/(a+b+c)$ ratio ranges from $10^{-2}$ to 0.8;

A and B are end groups like or different from each other, comprised in the following groups:

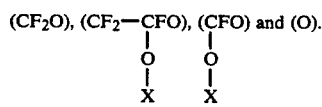

or a P radical deriving from the starter, if any, or from the solvent, if any, utilized in the process for preparing the peroxide perfluoropolyether;

Y is —F, —Cl, —COF or a P radical.

These perfluoropolyethers are mixtures of polymeric molecules, wherein each individual molecule can be lacking one or more of units

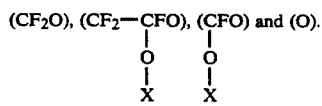

The values above attributed to coefficients a, b, c and d refer to the individual polymeric molecules. In a mixture of molecules, such coefficients assume average values, which can be integers or intermediate values between zero and 1 or between an integer and the successive integer. Usually, the mixture of polymeric molecules contains the four units $(CF_2O), (CF_2-CFO), (CFO)$ and $(O)$.
$\phantom{xxxxxxxx}|\phantom{xx}|$
$\phantom{xxxxxxxx}O\phantom{xx}O$
$\phantom{xxxxxxxx}|\phantom{xx}|$
$\phantom{xxxxxxxx}X\phantom{xx}X$ The ratios among the coefficients defined hereinbefore applies both to the individual polymeric molecules and to the mixtures of molecules.

Preferably, the value of "m" in the $(R'O)_mR''$ group ranges from 0 to 3; more preferably it is equal to zero.

Groups R" are preferably selected from the class consisting of $CF_3-$, $CF_3-CF_2-$, $nC_3F_7-$, $isoC_3F_7-$, $nC_4F_9-$, $isoC_4F_9-$ and $terC_4F_9-$. Among these groups, $CF_3-$, $CF_3-CF_2-$ and $nC_3F_7-$ are the most preferred; among the last three, $CF_3-$ and $CF_3-CF_2-$ are the most preferred.

The values of coefficients a, b, c and d are generally in the following ranges:
a: from 0 to 10,000,
b: from 0 to 10,000,
c: from 0 to 10,000,
d: from 0 to 10,000.

The sum b+c has a value generally ranging from 2 to 15,000 and more generally from 3 to 5,000. The sum a+b+c has a value generally ranging from 2 to 15,000 and more generally from 3 to 5,000. The sum a+b+c+d has a value generally ranging from 2 to 15,000 and more generally from 3 to 5,000.

When a and/or c are different from zero and also b is different from zero, the b/a+c ratio preferably ranges from $10^{-1}$ to 500.

When a and c are simultaneously different from zero, the c/a ratio is preferably in the range from $10^{-1}$ to 10.

The d/(a+b+c) ratio preferably ranges from 0.05 to 0.5.

The peroxide perfluoropolyethers according to the present invention are prepared by the processes described below.

According to a first process, into a liquid phase maintained at a temperature not exceeding +50° C. and consisting of a solvent and/or one or more perfluoroalkylvinylethers of formula $$CF_2=CF-OX \qquad (II)$$

wherein X has the meaning defined above, there are fed a gaseous oxygen stream and, optionally, a gaseous or liquid stream consisting of one or more perfluoroalkylvinylethers of formula (II), the latter stream being always present if the liquid phase does not contain perfluoroalkylvinylethers prior to the start of the reaction, and the liquid phase is irradiated by ultraviolet radiation having a wave length ranging from 2,000 to 5,000 Ångstroms.

This first process is usually utilized in the preparation of other peroxide perfluoropolyethers and is described for example in U.S. Pat. No. 3,699,145.

Generally, the liquid phase temperature is kept from −100° to +50° C. and, preferably, from −80° to 0° C.

According to a second process, into a liquid phase maintained at a temperature not exceeding +25° C. and consisting of a solvent and/or one or more perfluoroalkylvinylethers of formula (II) there are fed a gaseous oxygen stream, a gaseous or liquid stream of one or more compounds having one or more F-Q bonds, wherein Q is selected from the group consisting of F and O, and optionally a gaseous or liquid stream consisting of one or more perfluoroalkylvinylethers of formula (II), this last stream being always present if the liquid phase does not contain perfluoroalkylvinylethers prior to the start of the reaction.

This known process for the preparation of other perfluoropolyethers is disclosed in Italian patent application 20207 A/89 of the Applicant hereof, which is incorporated by reference into the specification of the present invention.

In this second process, the temperature of the liquid phase generally ranges from −120° C. to +25° C.

The compounds having one or more F-Q bonds are referred to, for convenience, as starters, this term, however, being not binding for the reaction mechanism.

When Q is oxygen, the starter is in particular an organic compound containing one or more fluoroxy groups. More usually it is a perfluorinated alkyl or alkylene compound containing one or more fluoroxy groups and optionally one or more heteroatoms, in particular oxygen and chlorine atoms.

The number of heteroatoms, if any, generally ranges from 1 to 10. Preferably the heteroatom is an ether oxygen atom.

The compound having F-O bonds usually contains one or two fluoroxy groups.

Among the preferred starters, the following can be cited:
1. $F_2$;
2. $R^3-OF$, in which $R^3$ is a perfluoroalkyl radical containing 1 to 10, and preferably 1 to 3 carbon atoms;
3. $R^4-O(CF_2O)_nCF_2OF$, wherein $R^4$ is a perfluoroalkyl radical containing 1 to 3 carbon atoms, and "n" ranges from 1 to 10 and, preferably, from 1 to 2.
4. $FO-CF_2-OF$.

The use of fluoroxy compounds as starters gives rise to the formation, in end groups A and B of the obtained peroxide perfluoropolyethers, of P radicals coming from said starters. Such radicals derive from the cleavage of the O-F bond and from other cleavages occurred in the fluoroxy-compound.

When end groups A and B consist of radical P or contain it, such radical can represent, in particular, a radical $R^1$, where $R^1$ is equal to $R^3$ or $R^4-O(CF_2O)_n-CF_2-$, in which $R^3$ and $R^4$ are the same as defined hereinbefore, or a radical $R^2$, derived from a cleavage of $R^3$ or $R^4-O(CF_2O)_n-CF_2-$, having a number of carbon atoms lower than the one of $R^1$ and, more usually, a carbon atom less.

Both in the first and in the second process, the solvent, when use is made thereof, is selected from straight and cyclic fluorocarbons, chlorofluorocarbons, perfluoroamines and perfluorinated ethers.

Examples of suitable fluorocarbons and chlorofluorocarbons are $CFCl_3$, $CF_2Cl_2$, $c.C_4F_8$, $c.C_6F_{12}$, 1-chloropentafluoroethane, 1,1,2-trichloro-1,2,2-trifluoroethane, 1,2-dichlorotetrafluoroethane and 1,1,1-trifluorotrichloroethane.

Examples of suitable perfluoroamines are perfluoroaminic Fluorinert ® produced by 3M.

Examples of suitable perfluorinated ethers are the perfluoropolyethers having a boiling point lower than 250° C., such as Galden ® produced by Montefluos.

Also the use of a solvent can give rise to the presence of P radicals in end groups A and B, radicals which are variable depending on the nature of the solvent.

In the second process, also a gas which is inert under the reaction conditions is preferably fed into the liquid phase. Such inert gas is usually fed in admixture with the starter or starters if such compounds are fed in the form of a gas stream into the liquid phase. It can be also fed, in part or in whole, along with oxygen: in other words, it is possible to use, instead of oxygen, mixtures of oxygen with inert gases, in particular air.

The inert gas, when it is used, is selected in particular from nitrogen, argon, helium, $CF_4$ and $C_2F_6$.

Both in the first and in the second process, oxygen is continuously fed into the liquid phase, the oxygen partial pressure in the reactor being generally in the range of from 0.01 to 10 atmospheres and, more usually, from 0.05 to 1 atmosphere.

Both in the first and in the second process, the perfluoroalkylvinylether or perfluoroalkylvinylethers concentration in the liquid phase generally ranges from 0.01 mole/liter and the molar concentration of the perfluoroalkylvinylether or perfluoroalkylvinylethers in the pure state.

In the second process, the starter or starters flow rate generally ranges from 0.001 to 5 moles per hour per liter of liquid phase and, more usually, from 0.01 to 2 moles per hour per liter of liquid phase.

Both in the first and in the second process, after a desired reaction time ranging for example from 0.1 to 20 hours, feeding of the reagents is stopped. The solvent, if any, and the unreacted monomer or monomers are separated, preferably by distillation, and the peroxide perfluoropolyether is obtained as a residue in the form of an oily liquid or of a semisolid material.

The reaction can be also conducted in a fully continous manner, by continuously withdrawing a liquid phase portion from the reactor, subjecting it to distillation, recycling the solvent, if any, and the unreacted monomer or monomers and recovering the reaction product.

It is also possible to combine the first and the second process, i.e. to conduct the reaction in the presence of ultraviolet radiations and, simultaneously, of starters.

By reduction of the peroxidic products of formula (I) it is possible to obtain, by means of known processes, non-peroxidic products of the formula:

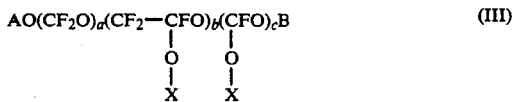  (III)

which too are an object of the present invention.

A suitable process for preparing the non-peroxidic products (III) consists in subjecting the peroxidic products (I) to a thermal reduction at temperatures generally ranging from 150 to 250° C., as it is described for example in U.S. Pat. No. 4,668,357.

Due to the thermal reduction, small amounts of units free from oxygen atoms in the polymeric chain:

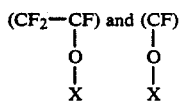

can form in the perfluoropolyether molecules.

Another suitable process consists in subjecting the peroxidic product (I) to a photochemical reduction at temperatures generally ranging from −40° to 150° C. in the presence of ultraviolet radiation having a wave length ranging from 2,000 to 5,000 Å and, optionally, in the presence of a solvent. This process is described, for example, in U.S. Pat. No. 3,715,378.

Objects of the present invention are also relate to new perfluoropolyethers having perfluoroalkyl end groups and optionally perfluoroalkyl end groups containing one or more ether oxygen atoms of formula:

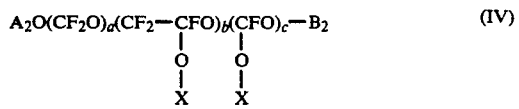  (IV)

End groups $A_2$ and $B_2$, like or different from each other, are selected from the group consisting of

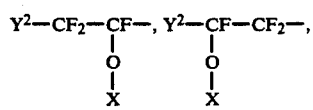

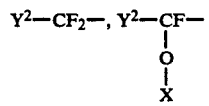

and radicals P derived from the starter or from the solvent, which have been used in the process for preparing the peroxide perfluoropolyether, wherein $Y^2$ is F, Cl or a radical P.

Radical P is in particular a radical $R^1$ or $R^2$ defined above.

Thus, it is apparent that the possible presence of perfluoroalkyl end groups containing one or more ether oxygen atoms is due to the use, in the preparation process, of starters consisting of organic fluoroxy compounds containing one or more ether oxygen atoms. The number of ether oxygen atoms generally ranges from 1 to 10, and preferably from 1 to 2.

A suitable process for obtaining the perfluoropolyethers having perfluoroalkyl end groups and optionally perfluoroalkyl end groups containing one or more ether oxygen atoms consists in subjecting the non-peroxidic product (III) to a thermal treatment in the presence of fluorine at temperatures generally ranging from 150° to 250° C., as it is described for example in U.S. Pat. No. 4,668,357.

Another suitable process for preparing the perfluoropolyethers having perfluoroalkyl end groups and optionally perfluoroalkyl end groups containing one or more ether oxygen atoms (IV) consists in subjecting the non-peroxidic product (III) to a photochemical process in the presence of fluorine. This treatment is generally carried out at temperatures ranging from 20° to 150° C. in the presence of ultraviolet radiations having a wave length ranging from 2,000 to 5,000 Å and in the optional presence of a solvent. This process is described, for example, in U.S. Pat. No. 4,664,766.

An object of the present invention are also new perfluoropolyethers having one or two hydrofluoroalkyl end groups of formula:

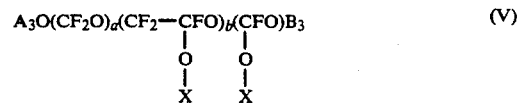  (V)

wherein end groups $A_3$ and $B_3$, like or different from each other, comprise

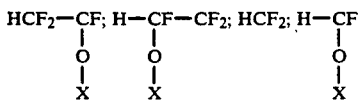

and end groups $A_2$ and $B_2$ defined above.

These new perfluoropolyethers of formula (V) are prepared by reacting the non-peroxide perfluoropolyether (III) with molten KOH at high temperature, as it is described for example in the article by D. Sianesi "Polieteri perfluorurati", La Chimica e l'Industria, vol. 50—No. 2, February 1968, pages 206–214.

An object of the present invention are also new perfluoropolyethers having one or two functional end groups of formula:

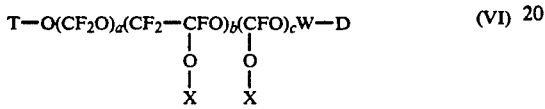
(VI)

1. in which W is a linking group, D is a functional group and T is perfluoroalkyl group $T_1$ or a perfluoroalkyl group containing one or more ether oxygen atoms or it is equal to D—W;

2. D is selected from the group consisting of —CN, —CH$_2$Z, —COR''',

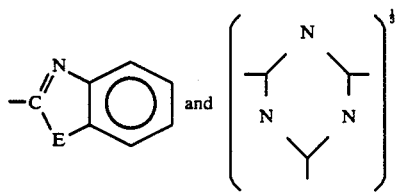

(wherein E is NH or an O atom or a S atom);

3. when D is —CH$_2$Z, Z is an OR$^5$ group, wherein R$^5$ is a hydrogen atom or a group:

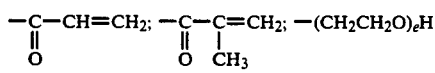

(wherein "e" is an integer ranging from 1 to 15);

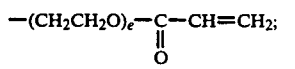

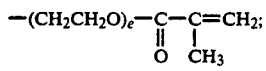

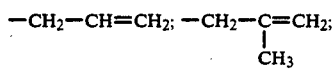

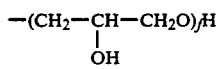

(wherein "f" is an integer ranging from 1 to 3);

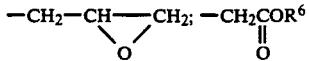

(wherein R$^6$ is an alkyl group containing 1 to 30 carbon atoms and optionally containing ether bonds of type —C—O—C—, or R$^6$ is a group —(CH$_2$—CH$_2$O)$_p$H where "p" ranges from 1 to 10);

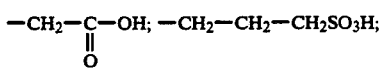

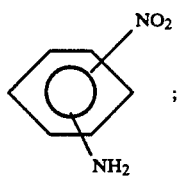

a naphthyl group; an alkylbenzyl group or a mono or poly-substituted benzylalkoxy group, of formula:

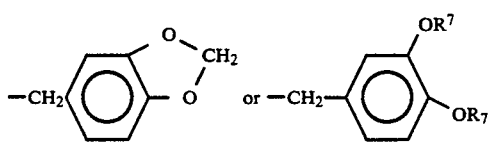

(wherein R$^7$ is an alkyl group containing from 1 to 4 carbon atoms); or Z is a nitrogenous group —NR$^8$R$^9$ wherein R$^8$ and R$^9$, like or different from each other, are hydrogen atoms or, individually or both groups R$^6$ as defined above, or, when R$^8$ is H, R$^9$ can be a group

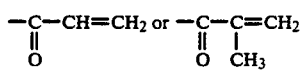

or R$^8$ and R$^9$ form together an imide cycle of formula:

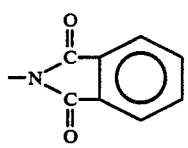

in which the phenyl group can contain a substituent group such as anhydride:

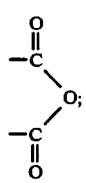

4. when D is a COR''' group, is a —NHR$^{10}$ group wherein R$^{10}$ is a hydrogen atom or an alkyl group containing 1 to 8 carbon atoms, or R$^{10}$ is a mono or polyhydroxyalkyl group containing 1 to 8 carbon atoms, an aminoalkyl group containing 1 to 8 carbon atoms, an allyl, methallyl, trimethoxy or triethoxysilane alkyl group of formula R$^{11}$—Si(OCH$_3$)$_3$ or R$^{11}$—Si(OC$_2$H$_5$)$_3$, wherein $R^{11}$ is an alkyl group containing 1 to 8 carbon atoms, or an isocyanoalkyl group of formula $R^{12}NCO$, wherein $R^{12}$ contains 1 to 8 carbon atoms, or an isocyanocycloalkyl group containing 5 or 6 carbon atoms, or an isocyanoaryl group containing 6 to 10 carbon atoms, optionally alkyl-substituted; or $R'''$ is an aromatic radical optionally substituted by halogen atoms and/or hydrocarbon groups;

5. perfluoroalkyl group $T_1$ or perfluoroalkyl group $T_1$ containing one or more ether oxygen atoms is selected from the class of groups $A_2$ and $B_2$ defined above. When group $R'''$ of function $COR'''$ is an aromatic radical substituted by halogen atoms and/or hydrocarbon groups, it is selected, for example, from the pentafluorophenyl, bromotetrafluorophenyl, dibromodifluorophenyl, bromophenyl and bromobenzophenyl groups.

The new functionalized perfluoropolyethers of formula (VI) can be prepared by known processes starting from the peroxide perfluoropolyethers (I) or from the non-peroxide perfluoropolyethers (III) and possible successive known reactions in order to pass from a functional group to another.

In order to prepare functionalized perfluoropolyethers (VI) starting from the peroxide perfluoropolyethers (I), a conventional reduction reaction, for example with HI, is carried out at temperatures generally ranging from 20° to 50° C. in the presence of alcohols, thereby obtaining perfluoropolyethers containing ester end groups.

This reduction reaction is described for example in U.S. Pat. No. 3,810,874.

In order to obtain functionalized perfluoropolyethers (VI) starting from non-peroxide perfluoropolyethers (III) it is possible to subject the latter to hydrolysis, wherefore end groups —COF are converted into —COOH groups. This process is described for example in European patent application No. 89107958.

The average functionality of the resulting perfluoropolyethers having end groups —COOH or —COOR generally ranges from 0.1 to 1.99 and preferably from 1 to 1.99. Products having a higher functionality are generally obtained by means of the first process for preparing peroxide perfluoropolyethers (I), i.e. the process which utilizes ultra-violet radiations.

To pass from perfluoropolyethers (VI) containing end groups —COOH or —COOR to perfluoropolyethers containing other end groups, known processes are used, which are described in many references for example in U.S. Pat. Nos. 3,810,874, 4,721,795, 4,757,145.

These processes are reported also in Italian patent application 47869 A/89 of the Applicant hereof, the content of which is incorporated into the specification of the present invention as a reference.

Linking groups W are generally

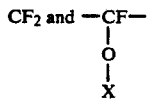

The average number molecular weight of the perfluoropolyethers of formulas (I), (III), (IV), (V) and (VI) according to the present invention generally ranges from 500 to 500,000 and, more usually, from 500 to 200,000.

The peroxide perfluoropolyethers (I) are useful as intermediates for preparing the perfluoropolyethers of formulas (IV), (V) and (VI) and, mainly when they have a low molecular weight, they are useful as cross-linking agents for elastomeric polymers, for example the elastomer copolymers of vinylidene fluoride and hexafluoropropene.

The non-peroxide perfluoropolyethers (III) are useful as intermediates, as mentioned above.

The perfluoropolyethers of formulas (IV) and (V) are useful, in particular, as fluid for electronic tests, for example thermal shock, "NID" and cross leaks, as lubricants, as fluids for the heat transfer and as agents for protecting monuments against atmospheric agents and pollutants.

The perfluoropolyethers containing functional end groups (VI) are useful in particular as lubricants, additives for lubricants, oil- and water-repellent fluids and as agents for protecting monuments against the atmospheric agents and pollutants.

Differently from the known perfluoropolyethers, the classes of perfluoropolyethers according to the present invention are free from units

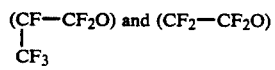

As compared to the perfluoropolyethers containing such units, they exhibit a much lower viscosity, the molecular weight being equal. This property is particularly evident when X is equal to —$CF_3$ and —$CF_2$—$CF_3$ and it reaches its maximum when X is equal to —$CF_3$. This low viscosity at equal molecular weight extends the field of use of the perfluoropolyethers according to the present invention both at the low and at the high temperatures with respect to the abovesaid known perfluoropolyethers.

Since at equal viscosity, the perfluoropolyethers according to the present invention have a much higher molecular weight than the abovesaid known perfluoropolyethers, they are endowed with a much lower vapour tension, wherefore their applicative field is by far wider, for example in the applications where it is operated under vacuum.

The following examples are given merely to illustrate the present invention and are not to be construed as a limitation of the scope thereof.

EXAMPLE 1A

Into a cylindrical glass reactor (having a volume of 50 cc and an optical path of 1 mm) equipped with a quartz coaxial inner sheath and also equipped with a plunging pipe for the letting-in of gas, with a sheath with a thermocouple for determining the inner temperature and with a reflux cooler maintained at a temperature of —80° C., there were introduced 87 g of liquid $CF_2=CFOCF_3$, at a temperature of —40° C.

3.8N l/h of oxygen were bubbled into the reactor through the plunging pipe. By means of a cooling bath arranged outside the reactor, the temperature of the liquid reacting phase was maintained at —40° C. throughout the test. After having introduced into the quartz sheath an ultra-violet ray lamp of 125 watt, type HELIOS, having an emission with wave length ranging from 2,000 to 6,000 Å, the lamp was switched on simultaneously with the starting of the oxygen feeding, and irradiation as well as oxygen feeding were carried on during 3 hours.

The lamp was switched off, it was degasified and the unreacted $CF_2=CF-OCF_3$ was distilled off. An oily polymer residue equal to 21.4 g was so obtained. Such residue exhibited, on iodometric analysis, an active oxygen content equal to 1.0% by weight. On NMR $^{19}F$ analysis it resulted to be composed of peroxide polyether chains of general formula:

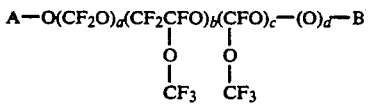

wherein A and B prevailingly consisted of $CF_3$ and COF. The $(a+c)/b$ ratio was of 0.81. The a/c ratio was of 1.4. The viscosity of the product at 20° C. was equal to 2130 cSt.

EXAMPLE 1B

A portion of 10.3 g of the product obtained in example 1A was introduced into a 25 cc flask equipped with a magnetic stirrer and gradually heated in 5 hours up to a temperature of 240° C. The flask was maintained for 2 hours at this temperature.

On conclusion, 7.6 g of product were recovered, which, on NMR $^{19}F$ analysis, revealed to have the polyether structure:

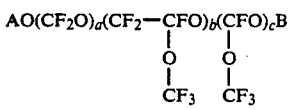  (I)

with end groups $-CF_3$ and acid end groups

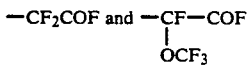

The amount of acid end groups was 0.07 mmole/g of oil.

Besides the oxyperfluoroalkylene units, there were present units

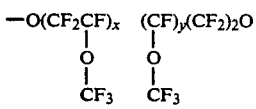

having 4 to 6 carbon atoms, in an amount of 0.42 mmole/g of oil.

In these units:

$x+y+z=2$ $y+z=2$ and $z=2$.

The product viscosity measured at 20° C. was equal to 350 cSt, and the iodometric analysis revealed the absence of peroxide groups.

EXAMPLE 1C

Into a flat-bottom cylindrical reactor provided with a magnetic stirring system, having a 600 cc volume, equipped with a cooled quartz sheath containing a Hg lamp type Hanau TQ 150, and also equipped with a plunging pipe for the gas feeding as well as with a thermometer sheath, there were charged 944 g of a nonperoxide acid perfluoropolyether deriving from the photooxidation of $CF_3-O-CF=CF_2$ in the liquid phase and subsequent thermal reduction, both carried out according to modalities analogous with the ones described in examples 1A and 1B. The starting product had a viscosity of 132 cSt at 20° C., /an $(a+c)/b$ ratio of 0.80, an a/c ratio of 1.6 and a content of acid end groups equal to 0.23 mmole/g.

After switching on of the lamp, which emitted utraviolet radiation with a wave length ranging from 2,000 to 6,000 Å, $F_2$ (3Nl/h) was made to flow from the plunging pipe, while the temperature inside the reactor rose until settling around 140° C. After a total time of 36 hours and 45 minutes of irradiation in the presence of fluorine, the reactor was discharged.

There were obtained 914 g of a product having a viscosity of 125 cSt at 20° C. which, on NMR $^{19}F$ analysis, exhibited the same chain structure of the starting product, but in which the acid end groups were substituted by end groups $-CF_3$.

The glass of the product transition temperature was equal to $-96°$ C.

EXAMPLE 2A

Using the same apparatus of example 1A and following the same modalities, a photosynthesis of 87 g of perfluoromethylvinylether was carried out at a temperature of $-55°$ C.

At the end of the test, 25.8 g of product were obtained, which, on iodometric analysis, exhibited an active oxygen content equal to 1.6%.

The NMR $^{19}F$ analysis revealed that it consisted of polyether-polyperoxide chains of general formula:

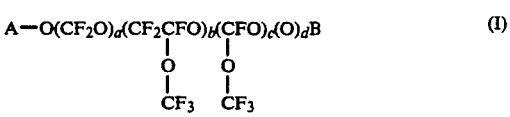  (I)

wherein A and B are end groups $-CF_3$ and $-COF$.

The $(a+c)/b$ ratio was equal to 0.49.

The a/c ratio was of 1.2. The product viscosity at 20° C. was of 2350 cSt.

EXAMPLE 2B

A portion of 15.5 g of the product obtained in example 2A was placed into a 25 cc flask equipped with a magnetic stirrer and gradually heated in 2 hours up to 190° C. This temperature was maintained for 1 hour. Subsequently, the temperature was raised in 2 hours up to 240° C. and it was maintained at such value during further 2 hours. On conclusion of the test, 10 g of product were recovered, which, on NMR $^{19}F$ analysis, exhibited the same structures as were identified for the product of example 1B. The end groups were:

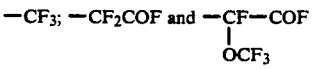

The content of acid end groups (i.e. containing the $-COF$ group) was equal to 0.11 mmole/g of oil and the content of units having 4-ε carbon atoms as defined in Example 1B was of 0.67 mmole/g of oil.

The product viscosity at 20° C. was of 300 cSt and the iodometric analysis confirmed the absence of peroxide structures.

EXAMPLE 3

Utilizing the same apparatus described in example 1A and operating according to the same modalities, a photosynthesis of perfluoromethylvinylether at a temperature of −40° C. was carried out by charging 50 g of liquid perfluoromethylvinylether and 40 g of liquid $CF_2Cl_2$ (used as a solvent).

At the end of the test, the solvent and the unreacted monomer were distilled off, thereby obtaining 14.6 g of an oily product which, subjected to iodometric analysis, exhibited an active oxygen content equal to 1.05%.

The NMR$^{19}$F analysis revealed that it consisted of polyether polyperoxide chains of the general formula:

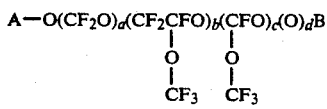

wherein A and B are prevailingly

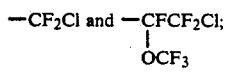

small amounts of the end groups —$CF_3$ and —COF were also present.

The (a+c)/b ratio was equal to 1.0 while the a/c ratio was equal to 1.4.

The product viscosity at 20° C. was of 880 cSt.

EXAMPLE 4

Utilizing the same apparatus described in example 1A and operating according to the same modalities, a photooxidation of 78 g of $CF_2=CFOCF_2CF_3$ was carried out at a temperature of −20° C.

On conclusion of the test, 17.2 g of product were obtained, which, on iodometric analysis, exhibited an active oxygen content equal to 0.4%.

The product viscosity at 20° C. was equal to 7430 cSt.

The NMR$^{19}$F analysis revealed that the product was composed of polyether polyperoxide chains of the general formula:

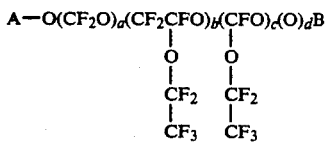

wherein A and B are end groups $CF_3$, $C_2F_5$ and COF.

The (a+c)/b ratio was equal to 1.43 while the a/c ratio was equal to 1.5.

EXAMPLE 5A

Utilizing the same apparatus described in example 1A and operating according to the same modalities, a photosynthesis of $CF_2=CF-O-CF_2-CF_3$ (89 g) was carried out at a temperature of −55° C.

At the end of the test there were obtained 23.9 g of a product which, on iodometric analysis, exhibited an active oxygen content equal to 1.2%.

The product viscosity at 20° C. was 16,200 cSt.

The NMR$^{19}$F analysis revealed that it consisted of polyether polyperoxide chains having general formula:

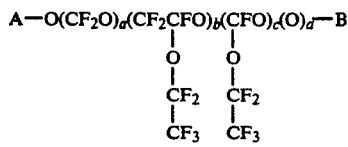

wherein A and B are end groups $CF_3$, $C_2F_5$ and COF.

The (a+c)/d ratio was equal to 0.47 while the a/c ratio was equal to 0.4.

EXAMPLE 5B

A portion of 9.1 g of the product obtained in example 5A was introduced into a 25 cc flask equipped with a magnetic stirrer and gradually heated in 5 hours up to 240° C.

After 2 hours at said temperature, 5.6 g of a product were recovered, which, on iodometric analysis, revealed no peroxide groups were present.

The NMR$^{19}$F analysis revealed, besides the previously defined ether structures, the presence of end groups

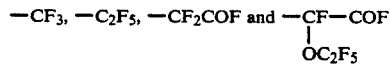

The content of acid end groups was of 0.33 mmole/g of product. There was revealed also the presence of sequences of units having 5–8 carbon atoms (0.31 mmole/g of oil) of formula

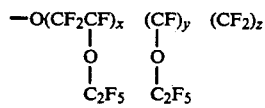

wherein:

$x+y+z=2$ $y+z=2$ $z=2$

The product viscosity at 20° C. was equal to 180 cSt.

EXAMPLE 6A

Using the same apparatus described in example 1A and operating according to the same modalities, a photooxidation of $CF_2=CF-O-CF_2-CF_3$ (84 g) at a temperature of −40° C. was carried out.

At the end of the test there were obtained 22.2 g of oil which, on iodometric analysis, exhibited an active oxygen content equal to 0.7%.

The product viscosity at 20° C. was equal to 9,600 cSt.

The general formula of the product, determined by means of NMR$^{19}$F analysis, was identical with the one of the product of example 4A, with (a+c)/b=0.74 and a/c=1.0.

The end groups were identical with those of the product of example 4.

EXAMPLE 6B

A portion of 15 g of the product obtained in example 6A was dissolved in 70 g of perfluoroheptane and irradiated with ultraviolet light, using the apparatus described in example 1A, at a temperature of −20° C. in a $N_2$ flow of 1N l/h.

After 15 hours the treatment was stopped and the solution was transferred into a 100 cc flask.

The solvent was removed by evaporation under vacuum. There were obtained 12 g of a product having a viscosity of 2,700 cSt at 20° C. which, on iodometric analysis, was found be free from peroxide.

The ether structures of the product and its end groups, determined by $NMR^{19}F$, were identical with those of the starting product.

EXAMPLE 6C

A portion of 70 g of the product obtained in example 6A was placed into a 25 cc flask equipped with a magnetic stirrer and gradually heated in 5 hours up to 240° C. This temperature was maintained for two hours. At the end of the test, 5.3 g of a product were recovered, which, an $NMR^{19}F$ analysis, proved to have the same structures and the same end groups as the one of example 5B.

The content of -COF end groups was of 0.2 mmole/g of oil and the content of the sequences with 5-8 carbon atoms was equal to 0.25 mmole/g of oil.

The product viscosity at 20° C. was equal to 240 cSt. The iodometric analysis did not reveal the presence of peroxide groups.

EXAMPLE 7

In a 500 ml glass reactor equipped with stirrer, thermometer, cooler with liquid at −78° C. connected to the atmosphere and gas feeding pipes reaching the reactor bottom, 200 g of perfluoromethylvinylether were condensed.

Then, maintaining such an outer cooling that the inner temperature remained at −72° C., there were separately fed, by bubbling into the liquid phase, an anhydrous oxygen flow of 2N l/h and a flow of 0.5N l/h of elemental $F_2$ diluted with 10N l/h of nitrogen, for 3.5 hours.

On conclusion of the reaction, the unreacted perfluoromethylvinylether and the reaction products having a boiling point lower than 30° C. were removed from the reactor, in an anhydrous $N_2$ flow.

Obtained were 23 g of a reaction rough product in the form of a colorless, transparent and viscous oil, the viscosity of which, measured at 20° C., was of 355 cSt.

The active oxygen content, determined by iodometric analysis, was equal to 3.1% by weight.

On $NMR^{19}F$ analysis, the ethereal structure of the product and its end groups proved to be analogous with the ones of the product of example 1A.

EXAMPLE 8A

Using the apparatus of example 7, maintained at −72° C., 150 ml of dichlorodifluoromethane were condensed, whereupon a perfluoromethylvinylether flow of 3N l/h and a mixture of 7N l/h of $O_2$, 0.35N l/h of methyl hypofluorite and 1N l/h of nitrogen were fed by separately bubbling them into the solvent.

After 3 hours, the reagent feeding was stopped, and the solvent and the reaction products having a boiling point lower than 30° C. were distilled in an anhydrous nitrogen flow.

There were thus obtained 16 g of product in the form of a colorless, transparent and viscous oil.

The content of active oxygen in the product, determined by means of iodometric analysis, was 2.2% by weight.

The $NMR^{19}F$ analysis revealed that the product consisted of polyether polyperoxide chains of formula:

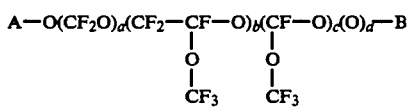

Radicals A and B consisted of

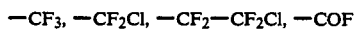

and 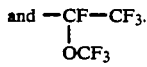

The ratio were:

$$\frac{a+c}{b} = 1.7 \text{ and } \frac{a}{c} = 2.0.$$

EXAMPLE 8B

According to the same modalities described in example 5B, a portion of 10 g of the product obtained in example 8A was subjected to thermal reduction. There were obtained 6.5 g of a non-peroxide product which, on $NMR^{19}F$ analysis, revealed to to have the same ether units and the same end groups as the starting product, but in the following ratios:

$$\frac{a+c}{b} = 1.3 \quad \frac{a}{c} = 1.7$$

The average number molecular weight of the product was equal to 2,200.

EXAMPLE 9

Using an apparatus similar to the one of example 7, but having 250 ml volume, maintained at −72° C., 45 ml of dichlorodifluoromethane and 28 g of perfluoro n-propylvinylether were condensed.

Then, a mixture of 4N l/h of oxygen, 0.35N l/h of methyl hypofluorite and 7N l/h of nitrogen was fed.

After 1 hour and 25 minutes the gas mixture feeding was stopped.

The oxypolymerization temperature was of −65° C.

In an anhydrous nitrogen flow, the volatile matter was distilled; then the rough product at a temperature of 50° C., was kept for about 24 hours in a $N_2$ flow.

16.7 g of a product in the form of a colorless, transparent and viscous oil were so obtained.

Its viscosity at 20° C. was of 41 cSt. The active oxygen content, determined by iodometric analysis, was equal to 0.4%.

The NMR[19]F analysis revealed that the product was composed of polyether polyperoxide chains of formula:

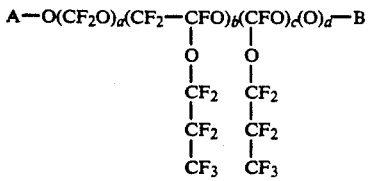

EXAMPLE 10

Using the same apparatus and following modalities identical with the ones described in example 1A, a mixture of perfluoromethylvinylether (32 g; 0.193 moles) and of perfluoroethylvinylether (42 g; 0.194 moles) was photo-oxidized for 3 hours at $-40°$ C. After the unreacted monomers were distilled off, an oily residue (20.9 g) having a viscosity of 5460 cSt at 20° C. was obtained, which, on iodometric analysis, proved to have an active oxygen content equal to 0.64% by weight.

On NMR[19]F analysis, the product was determined be a perfluoroether peroxide copolymer of formula:

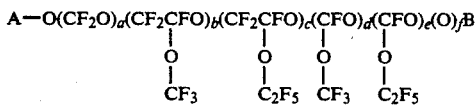

in which the units deriving from perfluoromethylvinylether (b+d) and the units deriving from perfluoroethylvinylether (c+e) were in an approximately unitary molar ratio. End groups A and B consisted prevailingly of groups $CF_3$, $C_2F_5$ and COF.

EXAMPLE 11

In a 1,000 cc flask equipped with mechanical stirrer, thermometer, reflux cooler and dropping funnel, a mixture was prepared which consisted of 99 g of peroxide perfluoropolyether, deriving from the photooxidation of $CF_3-O-CF=CF_2$ carried out according to modalities similar to the ones described in example 1A, of 150 cc of $CF_2Cl-CFCl_2$ and of 80 cc of $CH_3OH$.

The peroxide rough product exhibited the following characteristics:

active oxygen = 1.65% by weight
viscosity = 2660 cSt at 20° C.
(a+c)/b ratio = 0.8
a/c ratio = 1.2.

Then, through the dropping funnel, 76 g of HI aqueous solution at 57% by weight were gradually fed under stirring.

On conclusion of the addition, the mixture was maintained under reflux for about 7 hours in order to complete the reaction.

After having ascertained by means of NMR[19]F analysis the complete disappearance of peroxide, the mixture was transferred into a separating funnel. The lower phase was separated, washed once with a 0.01N solution of $Na_2S_2O_3$ in order to remove the $I_2$ residues, then twice with $H_2O$ and anhydrified on $Na_2SO_4$. After evaporation of the solvent under vacuum (2 C Torr), 77 g of perfluoropolyether having prevailingly $-COOCH_3$ end groups were obtained. The infrared analysis exhibited an intense band at 1787 cm$^{-1}$ attributable to the ester function.

The equivalent weight of the product, determined by acidimetric titration, was 630.

EXAMPLE 12

9.3 g of the methyl ester derivative obtained in example 11 were charged into a 20 cc flask and were added with 3 g of $H_2O$. The whole was heated at reflux, while slightly bubbling nitrogen through a plunging pipe, in order to have an effective mixing of the two phases. After 14 hours, the infrared analysis revealed the complete disappearance of the band attributable to the ester function. The organic phase was separated and then dried by treatment under vacuum (5 torr) at 100° C. 9.0 g of perfluoropolyether having prevailingly $-COOH$ end groups were obtained. The infrared analysis showed a broadened band at 1770 cm$^{-1}$, typical of the $-COOH$ group.

EXAMPLE 13

Into a 250 cc flask, equipped with mechanical stirrer, reflux cooler, thermometer and dropping funnel, there were charged 1.5 g of $NaBH_4$, previously ground and dried for 3 hours at 150° C., and 40 cc of anhydrous ethanol. To this solution there were added in about one hour, by means of the dropping funnel, 14.5 g of the ester derivative obtained in example 11. The addition was carried out under a slight nitrogen flow both to maintain the anhydrous atmosphere and to dilute the hydrogen which developed during the reduction reaction. The addition speed was regulated in order to have a mixture reaction temperature not exceeding 25° C. On conclusion of the addition, stirring was carried out for one hour, whereupon an infrared analysis of the fluorinated phase revealed the total disappearance of the ester band and, therefore, the completeness of the reduction.

The hydrolysis of the reaction intermediate boron alcoholate and the removal of the unreacted $NaBH_4$ were carried out by dropwide addition of a 10% HCl solution. Stirring was conducted for 2 hours at 50° C.; then the organic phase was separated, and then dried by heating under vacuum (5 torr) at 100° C.

13.3 g of perfluoropolyether having end groups prevailingly consisting of $-CH_2OH$ were obtained.

The NMR[1]$_H$ analysis revealed that two types of alcohol end groups:

$-OCF_2CH_2OH$ and $-OCF(OCF_3)CH_2OH$ in a 1:1.3 ratio were present.

EXAMPLE 14

The product having perfluoroalkyl end groups, obtained in example 1C, was subjected to fractionation according to the fractionated precipitation method.

To this purpose, 300 g of said product were dissolved, at 15° C., in 2,000 ml of freon 113.

Maintaining a constant temperature of 15° C., variable amounts of methanol were progressively added and the insoluble fractions were collected time by time.

Table 1 shows the added methanol amounts, the amounts of collected fractions and, for each fraction, the viscosity at 20° C. and the molecular weight determined by V. P.O.

TABLE 1

| FRACTION NO. | AMOUNT OF ADDED METHANOL (in ml) | PRODUCT AMOUNT IN THE FRACTION (in g) | VISCOSITY (cSt) at 20° C.) | AVERAGE NUMBER MOLECULAR WEIGHT |
|---|---|---|---|---|
| 1 | 12 | 25,3 | 271 | — |
| 2 | 15 | 29,22 | 250 | 6,830 |
| 3 | 17 | 24,72 | 222 | 6,080 |
| 4 | 22 | 24,47 | 179 | 5,160 |
| 5 | 30 | 31,91 | 189 | 4,780 |
| 6 | 30 | 26,66 | 145 | — |
| 7 | 45 | 27,79 | 158 | 3,950 |
| 8 | 60 | 26,12 | 93 | 3,490 |
| 9 | 100 | 24,38 | 69 | 3,080 |
| 10 | in dry conditions (i.e. after evaporation of the whole solvent) | 48,43 | 23 | 1,730 |

Example 2 of European patent application 259,980, relating to perfluoropolyethers, prepared from perfluoroolefins and vinylethers, reports for an average number molecular weight of 3,000 a viscosity value of 226 cSt at 20° C. for a product containing the oxyperfluoroalkylene units

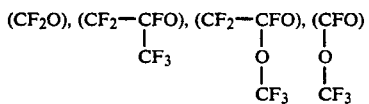

while for a product of practically identical molecular weight having only the units

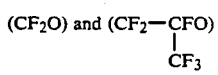

the viscosity is equal to 270 cSt at 20° C.

From Table 1 it is apparent that for a product conforming to the present invention, having a molecular weight of about 3,000 (see fraction 9), the viscosity is of only 69 cSt at 20° C.

We claim:

1. Perfluoropolyether having one or two functional end groups, said perfluoropolyether having the formula:

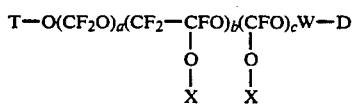

wherein:

1) W is a linking group, D is a functional group and T is a perfluoroalkyl or an oxyperfluoroalkyl group $T_1$ or is equal to D-W;

2) X is at least one $(R'O)_m R''$ group, wherein R' is selected from the group consisting of —$CF_2$—, —$CF_2$—$CF_2$— and

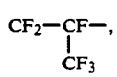

m is 0 to 6, and R" is a perfluoroalkyl group selected from the group consisting of straight chain groups having 1 to 10 carbon atoms, branched chain groups having 3 to 10 carbon atoms and cyclic groups having 3 to 6 carbon atoms;

3) coefficients a, b and c and the ratios among them have the following values:

a, b, c are each zero or integers such that the sum of b+c is equal to or greater than 2, the sum of a+b+c is equal to or greater than 2, with the proviso that when a or c or both a and c are not zero and b does not equal zero the ratio b/a+c ranges from $10^{-2}$ to $10^3$, when a and c are both different from zero, the c/a ratio ranges from $10^{-2}$ to $10^2$;

4) D is selected from the group consisting of —CN, —$CH_2Z$, —COR''',

wherein E is NH or O or S atom;

5) when D is —$CH_2Z$, Z is an $OR^5$ group, wherein $R^5$ is a hydrogen atom, or:

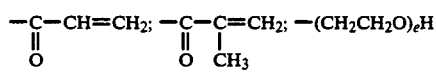

wherein e is an integer from 1 to 15

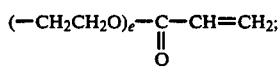

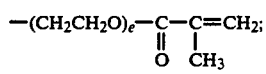

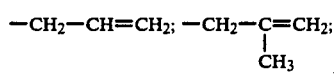

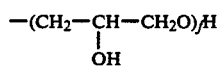

wherein f is an integer from 1 to 3

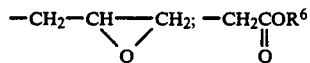

wherein $R^6$ is an alkyl group containing from 1 to 30 carbon atoms and optionally containing ether bonds of type —C—O—C—, or $R^6$ is a —(C$H_2$—$CH_2)_p$H group wherein p ranges from 1 to 10;

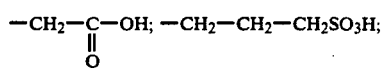

-continued

a naphthyl group, an alkylbenzyl group or a mono- or polysubstituted alkoxybenzyl group of formula:

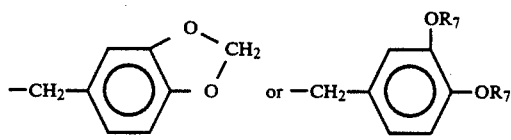

wherein $R^7$ is an alkyl group containing 1 to 4 carbon atoms; or Z is a nitrogenous group $-NR^8R^9$, wherein $R^8$ and $R^9$, like or different from each other, are hydrogen atoms or, either individually or both, $R^6$ as defined above, or, when $R^8$ is H, $R^9$ can be

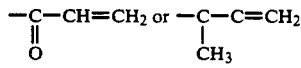

or $R^8$ and $R^9$ together form an imidic cycle of formula:

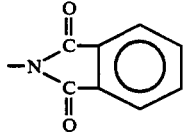

wherein the phenyl group can carry an anhydride substituent group, 6) when D is a $COR'''$ group, $R'''$ is OH, $-OCH_3$ or a $-NHR^{10}$ group wherein $R^{10}$ is a hydrogen atom or an alkyl group containing 1 to 8 carbon atoms, or $R^{10}$ is a mono or polyhydroxyalkyl group containing 1 to 8 carbon atoms, an aminoalkyl group containing 1 to 8 carbon atoms, an allyl, a methallyl, trimethoxy or triethoxysilanealkyl group of formula $R^{11}-Si(OCH_3)_3$ or $R^{11}Si(OC_2H_5)_3$, wherein $R^{11}$ is an alkyl group containing 1 to 8 carbon atoms, or an isocyanoalkyl group of formula $R^{12}NCO$, wherein $R^{12}$ contains 1 to 8 carbon atoms, or an isocyanocycloalkyl group containing 5 or 6 carbon atoms, or an isocyanoaryl group containing 6 to 10 carbon atoms, all said groups being optionally alkyl substituted; or $R'''$ is an aromatic radical optionally substituted by halogen atoms and/or hydrocarbon groups;

7) the perfluoroalkyl or oxyperfluoroalkyl group $T_1$ is selected from the group consisting of

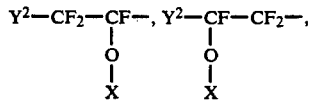

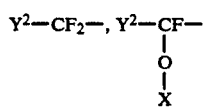

wherein X is defined above and $Y^2$ is selected from the group consisting of F, Cl or a P radical selected from the group consisting of $R^3$ and $R^4-3-(CF_2O)_n-CF_2$ in which $R^3$ is a perfluoroalkyl radical containing 1 to 10 carbon atoms; $R^4$ is a perfluoroalkyl radical containing 1 to 3 carbon atoms; and n has a value of from 1 to 10;

8) and the linking group W is selected from the group consisting of $CF_2$ and

2. Perfluoropolyethers having one or two functional end groups according to claim 1, in which, in the meaning of X, "m" is equal to zero.

3. Perfluoropolyethers having one or two functional end groups according to claim 1, in which, in the meaning of X, R" is selected from the class consisting of $CF_3-$, $CF_3-CF_2-$, $nC_3F_7-$, $isoC_3F_7-$, $nC_4F_9-$, $isoC_4F_9-$ and $terC_4F_9-$.

4. Perfluoropolyethers having one or two functional end groups according to claim 3, characterized in that R" is selected from the group consisting of $CF_3-$, $CF_3-CF_2-$ and $nC_3F_7-$.

5. Perfluoropolyether of the formula:

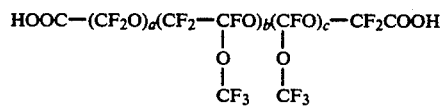

wherein a, b and c and the ratios among them have the following values:

a, b and c are each zero or integers such that the sum of b+c is equal to or greater than 2, the sum of a+b+c is equal to or greater than 2 with the proviso that when a or c or both a and c are not zero and b does not equal zero the ratio b/a+c ranges from $10^{-2}$ to $10^3$ and when a and c are both different from zero the c/a ratio ranges from $10^{-2}$ to $10^2$.

* * * * *